June 1, 1954

J. CARTON 2,680,224

STANDARD SOURCES OF ELECTROMOTIVE FORCE

Filed March 15, 1951

INVENTOR
JEAN CARTON

By *[signature]*
ATTORNEY

Patented June 1, 1954

2,680,224

UNITED STATES PATENT OFFICE 2,680,224

STANDARD SOURCES OF ELECTROMOTIVE FORCE

Jean Carton, Paris, France

Application March 15, 1951, Serial No. 215,790

Claims priority, application France March 16, 1950

9 Claims. (Cl. 321—1.5)

This invention has for an object to provide a thermoelectric standard source of E. M. F. which can be built at low cost as a compact and sturdy unit.

The accurate measurement of small direct-current electromotive forces, whether derived directly from an electrical value or controlled by any other physical value, is generally effected by means of a zero method involving the use of a standard source of electromotive force.

Such a method is used, for example, for the measurement and recording of temperatures by means of a thermocouple and an automatically balanced potentiometer, and for the measurement of pH values, a Weston cell being almost invariably used for supplying a standard E. M. F. Though Weston cells of a high standard of perfection are now available, these cells are only suitable for operation within a narrow range of temperatures and are only capable of supplying extremely small currents. Furthermore, they are extremely fragile and cannot be used where they are subject to high acceleration.

In the precision measurement of temperatures, two thermocouples are often used, one being in contact with the medium the temperature of which is to be measured, and the other being maintained at a constant temperature, by immersion in a boiling liquid, or in the escaping vapor from such liquid at a predetermined pressure, or, for example, in a bath of liquid obtained by melting a solid substance and still containing part of this substance in the solid state. In this method, the second thermocouple is utilized as a standard source of E. M. F. The method is, however, only suitable for laboratory use, since it cannot be used with portable apparatus and has to be kept under constant supervision.

According to one aspect of this invention, a standard source of E. M. F. comprises in compact combination:

(a) a temperature-control device of small thermic inertia, comprising a detecting member for measuring the temperature of a surrounding medium and equipped with any suitable means for controlling the flow of current in an electric heating device;

(b) a thermoelectric generator, comprising one or more thermocouples, or a thermopile;

(c) a vessel enclosing entirely said thermoelectric generator, said vessel being made and arranged to follow as accurately as possible the temperature fluctuations of the temperature-control device, the thermoelectric generator being separated from said enclosing vessel through a medium having a high thermic inertia with respect to the time constant of said temperature control device, so that the amplitude of the temperature variations measured by the control device is greatly attenuated when the fluctuations reach the thermoelectric generator;

(d) an electric heating device, utilizing, for example, the Joule effect or eddy currents, and controlled by the temperature-control device, this heating device comprising means for distributing its heat output as uniformly as possible unless this is already ensured by the source of heat itself.

These various means can be intimately combined in a variety of ways, and one element may be utilized for performing several functions.

Two specific embodiments will now be described with reference to the accompanying drawing in which.

Figure 1:
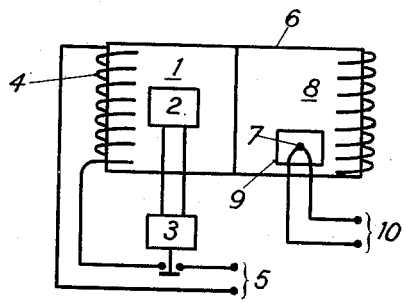
Fig. 1 is a circuit diagram.

Referring now first to Fig. 1, the temperature detecting member 2 of the temperature-control device 1 is preferably, for reasons of simplicity, of the expansion type, and may, for example, be a mercury thermometer or a bi-metallic strip. It closes a pair of electric contacts which preferably are adjustable. These contacts may directly control the flow to the heating device 4 of current from an electric source (not shown) connected to terminals 5, or the control may be effected indirectly by means of a relay 3, if the value of current is too high for direct control.

To obtain a medium of great thermic inertia, that is to say a medium having a high ratio of heat capacity to heat conductivity, one may obviously act upon one of these two factors, or upon both of them. A heterogeneous medium may comprise, for instance, elements having a great heat capacity separated by intervals of low thermal conductivity. Similarly a homogeneous medium must have high specific heat and low heat conductivity.

This medium 8 with high thermic inertia surrounds the thermoelectrical generator 7 having a casing 9, which may be arranged in a hollow body 6 and connected to terminals 10, which, in turn, are connected to the measuring circuit.

When the standard source of E. M. F. according to the present invention is to be used with a thermocouple for temperature measurements, it is only necessary to connect it in series with this thermocouple, in such manner that their electromotive forces are opposed. When the electromotive force of the standard source is to be used in opposition to a source of another type, for example to a concentration element (dry battery), either directly or with the interposition of a potentiometer, it is necessary in order to eliminate parasitic electromotive forces to use a standard source composed of two thermoelectric standard units according to the invention, connected in opposition and operated at different temperatures.

In order that the features and advantages of the invention may be better understood, an embodiment of a standard source of E. M. F., which may be used for physiological temperature measurements with a thermo-couple, will now be described more in detail with reference to Fig. 2, it being understood that the invention is in no way limited to said particular embodiment or use.

Figure 2:
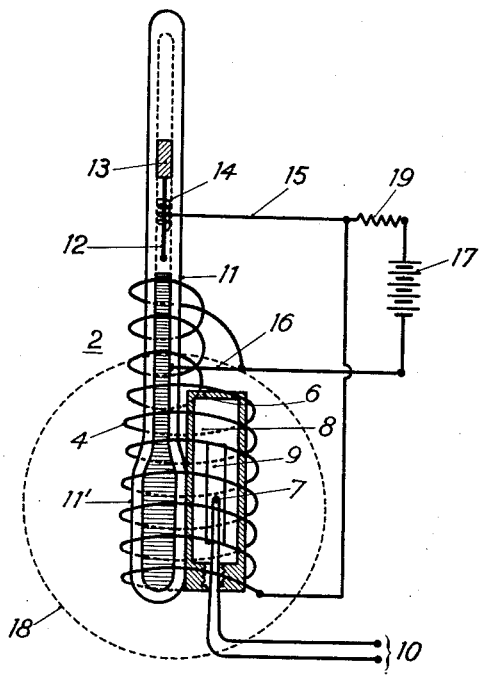
Fig. 2 is a somewhat diagrammatic representation of one embodiment.

Referring now to Fig. 2, 11 represents a mercury thermometer having an adjustable contact, of the known type in which a rod 12 carrying a small magnetic mass 13 may be slidably moved in the capillary tube by means of a magnet (not shown). The rod 12 is electrically connected to a helical winding 14, which is in turn connected to an external electric circuit 15.

The thermometer bulb 11' is in contact with a hollow body 6, which has heat dissipation characteristics comparable to those of the thermometer bulb 11'. This hollow body has great thermal inertia, in relation to the response time factor of the thermometer, that is to say it has a high ratio of heat-storage capacity (calorific mass) to overall heat conduction (global coefficient of heat transmission).

The hollow body 6 is filled with a substance or any medium 8, preferably of low thermal conductivity, in which a small-sized device 9 is introduced. The hollow body 6 is closed at the bottom by a screwed-in plug made of same material as the body 6, or of a material having the same thermal characteristics.

The thermometer bulb 11' and the hollow body 6 are surrounded by a heating resistance coil 4, adapted to be supplied with electric current from a suitable source, for example from a battery 17, one terminal of which is connected to one end 4 of the coil and to a conductor 16 connected to the column of mercury near its lower end.

The thermometer bulb and the hollow body 6 are placed in a common thermally insulating enclosure schematically indicated at 18.

In use, the adjustable rod 12 is first moved into such a position as to make contact with the mercury at the desired temperature. The accuracy of the rod's position may be checked by means of a microscope or any other suitable optical device.

If the temperature is such that the mercury column is not yet in contact with the rod 12, the battery 17 supplies current to heating coil 4 through an auxiliary resistance 19, thus causing the temperature of the thermometer bulb to rise and the mercury to climb up in the column. When the mercury makes contact with the rod 12, the heating circuit is short-circuited and supplies no more heat, whereupon the temperature of the thermometer begins to fall, owing to various heat losses, and when the mercury moves out of contact with the rod 12, the heating circuit is again energized, and the same cycle repeats itself. The temperature accordingly moves up and down between two values, which may be very close to each other. In a particular case, the difference between these two temperatures was kept within a few tenths of a degree.

As above explained, the hollow body 6, owing to its heat capacity and poor conductivity, reduces the amplitude of the periodic temperature variations, and as a consequence the temperature variations of the thermometer bulb, small though they already are, are further greatly reduced at the location of the thermocouple 7, the temperature of this thermocouple being substantially halfway between the highest and the lowest temperatures reached by the thermometer, and the E. M. F. supplied by the thermocouple 7 being therefore very nearly constant. The thermocouple 7 is connected to terminals 10, by means of which it can be connected to an external circuit (not shown).

The body of high thermal inertia may be made by spirally winding a strip of copper foil, the individual turns being separated by a paper strip of suitable thickness.

Figure 3:
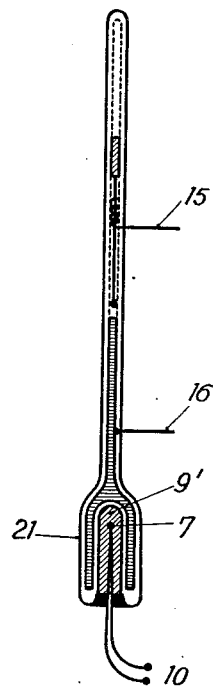
Fig. 3 illustrates a modification.

In the embodiment of Fig. 3, the thermometer bulb 11 is of hollow form like the finger of a glove in which is inserted a body 9' of high thermal inertia, for instance an insulating substance such as tar or resin, and the thermocouple 7 is placed within this body 9'.

It will be readily appreciated that the present invention makes it possible to provide standard sources of electromotive force which can be used under temperature conditions under which none of the hitherto available standard sources capable of industrial manufacture could be used. Apart from this, the standard units according to the invention are not affected by variations of air pressure and humidity, they keep practically indefinitely and are extremely stable both at rest and in operation. Moreover they can supply current of appreciable strength without materially affecting the value of their electromotive force, and they can be made in a very sturdy form capable of withstanding high accelerations and insensitive in operation to their angular disposition.

What I claim is:

1. A thermoelectric device for the production of an electromotive force of high constancy, comprising a mercury thermometer having a reservoir for the mercury, a contact element in said thermometer, a control circuit including said mercury and said contact element, thermally conductive partition means defining a heating chamber adjacent said reservoir but separated from the mercury thereof by said partition means, a thermojunction in said heating chamber, an output circuit including conductor means connected to said thermojunction and passing outwardly from said chamber, heater means surrounding said heating chamber and said reservoir, energizing means for supplying energy to said heater means, and means including said control circuit for rendering said energizing means ineffective to cause further heating upon the establishment of contact between said mercury and said contact element.

2. A thermoelectric device according to claim 1 wherein said chamber contains a medium of high thermal capacity surrounding said thermojunction.

3. A thermoelectric device according to claim 2 wherein said medium has a lower thermal conductivity than said partition means.

4. A thermoelectric device according to claim 1 wherein said partition means forms an enclosure alongside said reservoir and in contact with the walls thereof.

5. A thermoelectric device according to claim 1 wherein said reservoir has a thermally conductive wall constituting said partition means and formed with a re-entrant portion defining a recess in said reservoir, said recess constituting said heating chamber.

6. A thermoelectric device for the production of an electromotive force of high constancy, comprising a thermosensitive element, contacts having a first electrical condition which they normally assume and a second electrical condition which they are caused to assume by said thermosensitive element in response to heating of said element to a predetermined temperature, a thermally conductive enclosure adjacent said element, said enclosure being filled with a substance of high thermal inertia, a thermojunction imbedded in said substance, an output circuit including conductor means connected to said thermojunction and passing outwardly from said enclosure, heater means surrounding said enclosure and at least a portion of said thermosensitive element, an energizing circuit for supplying energy to said heater means, and means including the said contacts for energizing said heater means in the first condition of said contacts only.

7. A thermoelectric device according to claim 6 wherein said thermosensitive element comprises a mercury thermometer provided with a mercury reservoir in contact with said enclosure.

8. A thermoelectric device according to claim 7 wherein said heater means comprises an electric heating coil wound around said enclosure and said reservoir.

9. A thermoelectric device according to claim 6 wherein said enclosure, said heater means and an adjacent part of said thermosensitive element are surrounded by a further, thermally insulating enclosure.

References Cited in the file of this patent
UNITED STATES PATENTS

| Number | Name | Date |
|---|---|---|
| 2,312,022 | Brooks | Feb. 23, 1943 |
| 2,463,944 | Borden | Mar. 8, 1949 |